Jan. 24, 1956  B. G. BIRDWELL  2,732,253
VEHICLE DUMP UNIT WITH INITIAL LIFTING AID
Filed April 12, 1955
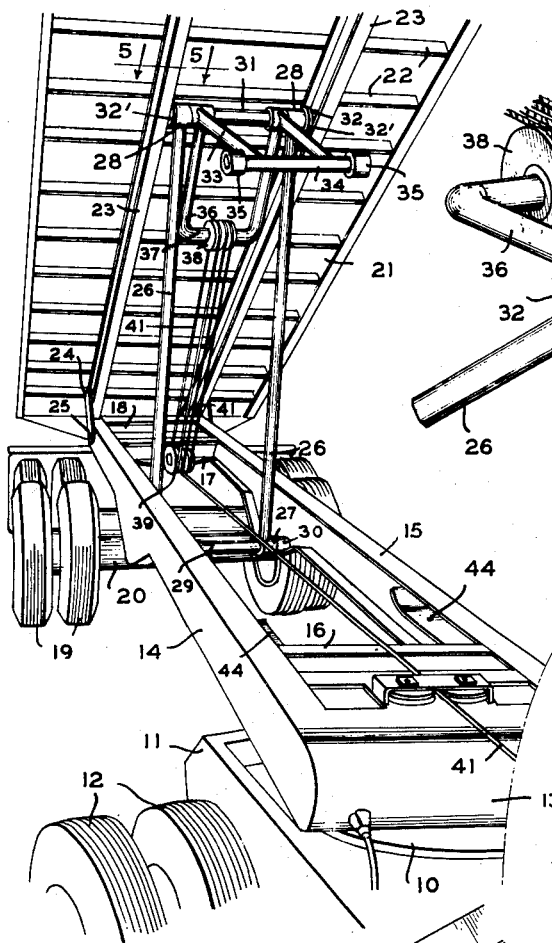
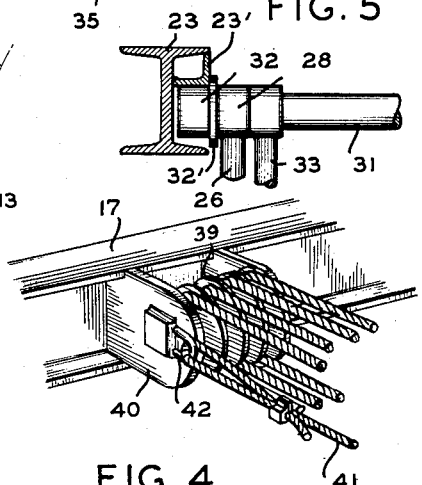
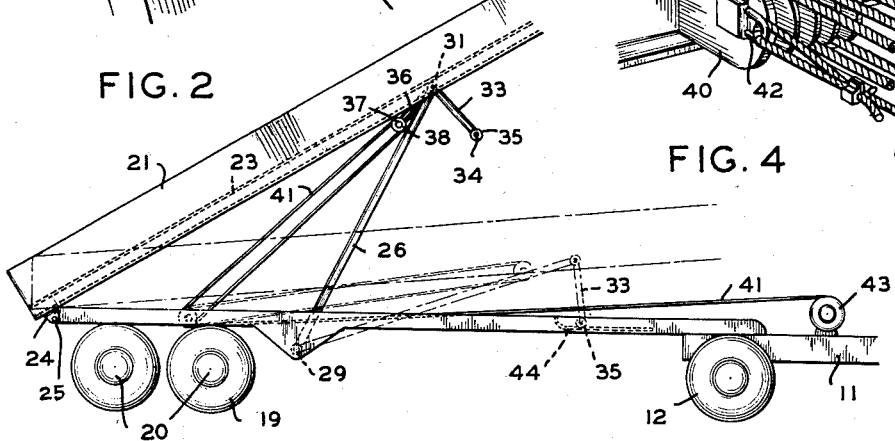
INVENTOR
BILLY G. BIRDWELL
BY A. Yates Dowell
ATTORNEY

United States Patent Office 2,732,253
Patented Jan. 24, 1956

2,732,253

VEHICLE DUMP UNIT WITH INITIAL LIFTING AID

Billy G. Birdwell, Odessa, Tex.

Application April 12, 1955, Serial No. 500,724

6 Claims. (Cl. 298—21)

This invention relates to the movement of commodities and to mechanism or equipment employed in producing or accomplishing such movement.

The invention relates particularly to vehicles of the character employed in hauling sand, gravel and the like in relatively large heavy loads and where it is desirable to transport the material rapidly in large amounts, as, for example, during excavation, building and other work.

The invention relates specifically to cable-operated dump body trailers and trucks capable of hauling a relatively large heavy load and capable of dumping or discharging such load in a minimum of time and over a relatively small area by tilting the load-containing body of the vehicle.

The present invention is of the same general character as that disclosed in my co-pending applications Serial Nos. 363,830, filed June 24, 1953; 436,041, filed June 11, 1954, Patent No. 2,718,430, September 30, 1955; and 472,933, filed December 3, 1954, Patent No. 2,718,429, September 30, 1955. In the applications enumerated a load-carrying body is pivoted at its rear end on the rear end of a trailer frame or chassis and means are provided for raising and lowering the front end of the body so that the contents may be discharged from the rear end of the body, the raising of the front end of the body being accomplished by means of struts pivoted to the forward portion of the body and the employment of block and tackle means for moving the lower ends of the struts along the frame, such lower ends being provided with rollers which rest upon inwardly extending track-forming flanges carried by the frame, the last-filed application including a kicker or structure for producing initial raising movement of the body, thus reducing the amount of force required in initiating the raising movement.

Under certain conditions, it may be desirable, instead of having the lower ends of the body raising struts movable along the frame, to provide a construction in which the lower ends of the struts are supported on a pivot on the frame which pivot does not move longitudinally of the frame but instead the upper ends of the struts move longitudinally of the underside of the body. It is therefore an object of the invention to provide a structure of this character including a cable-operating means and a bell crank lever mechanism for initiating the raising movement of the body to reduce the force required to produce the start of the raising action.

Another object of the invention is to provide a structure of the above character which is relatively simple, strong, durable and efficient and to incorporate the same in a trailer with only a slight modification of the same and in which the body can be removed if it is desired to use the trailer for other purposes.

A further object of the invention is to provide a trailer unit having a dump body and mechanism for raising and lowering the body to permit the discharge of a load and the return of the body to a load-receiving position and with such mechanism including a windlass mounted directly thereon or on a propelling tractor and with force multiplication means such as a cable with block and tackle for producing a lowering and raising movement.

Other objects and advantages of the invention will be apparent from the following description taken in conjunction with the accompanying drawing wherein:

Fig. 1 is a fragmentary perspective illustrating one application of the invention and with the body of the trailer elevated;

Fig. 2, a fragmentary longitudinal section on a reduced scale;

Fig. 3, an enlarged fragmentary detail of the movement initiating mechanism;

Fig. 4, an enlarged fragmentary detail perspective illustrating the fixed mounting of the pulleys or sheaves; and Fig. 5, an enlarged cross-section taken on lines 5—5 of Fig. 1.

Briefly stated, the invention comprises a conventional truck or tractor having a chassis with a body pivoted thereon at one end, struts for raising one end of said body to discharge the load, said struts having their lower ends pivoted on the chassis and their upper ends rollable against the underside of the body and provided with bell crank lever mechanism. On the upper end of said struts, the bell crank lever is rotated to cause such lever mechanism to engage the chassis, when the body is in lowered position, to raise the body initially and with continued raising being accomplished by continued pull on the bell crank lever mechanism on the upper ends of the struts causing such struts to be raised, the force for which is supplied by a cable on a windlass of the vehicle.

With continued reference to the drawing a conventional truck or tractor includes the lower section of a fifth wheel 10 mounted on frame 11 supported by dual wheels 12. Upon the fifth wheel 10 is pivotally supported the front end of a trailer unit 13 including a frame comprising a pair of longitudinal members 14 and 15 disposed in spaced parallel relation and connected by cross members 16, 17 and 18, also mounted in spaced parallel relation.

The trailer unit 13 is supported adjacent its rear end by means of dual wheels 19 mounted on axles 20. The bed or body 21 includes transverse supports 22 and longitudinal supports or truss members 23 from each of which is disposed a lug or hinge member 24 with a pivot pin 25 connecting the same to the rear end of the frame members 14 and 15 so that the body may be tilted by raising and lowering the front end of the same.

In order to raise its front end and discharge the contents of the body a pair of struts 26 are provided, each having an integral sleeve 27 at its lower end supported on a transverse shaft 29 journaled in bearings 30. These bearings 30 are positioned in lowered portions of frame members 14 and 15.

At the upper ends of the struts 26 and in the sleeves 28 is mounted a shaft 31 on each end of which is mounted a roller 32 which has an annular flange 32′ which rollers 32 travel within the frame supports or trusses 23. The lower end of the struts 26 are positioned rearwardly of the frame 11 so that the struts extend forwardly when they are in horizontal position with the body 21 lowered.

The truss members 23 of the body 21 constitute I-beams having an angle iron trackway 23′ welded between their upper flanges and their webs as shown in Fig. 5 of the drawing.

Means is provided for swinging the outer or free ends of the struts upwardly for raising the front end of the body and with such means is also included a movement initiating leverage system to reduce the amount of force required for producing initial upward swinging movement of the struts and upward movement of the body.

Such structure comprises a bell crank lever mechanism which includes spaced lever arms 33 which support at their outer ends a transverse bar 34 having a pair of rollers 35, one on each end. The arms 33 are welded to the shaft 31 and bar 34 or are formed integral therewith in order that they may engage the flanges 44 attached within the forward position of the frame members 14 and 15 of the trailer and by pivotal movement force the shaft 31 and rollers 32 and the body against which they engage upwardly from the frame members the distance between the rollers 32 and 35. In order to do this it is necessary that the shaft 31 be supported and rotated and for this purpose a pair of arms 36 are welded or otherwise fixed to the shaft 31 and the outer ends of these arms 36 are connected by a relatively short shaft 37 on which are pivoted a series of sheave wheels 38 movable relative to a series of sheave wheels 39 mounted by the fixed supports 40 on the transverse member 17.

A cable 41 is provided, having one end fixed in an eye 42 on one of the members 40 and then successively extending around the sheave wheels 38 and 39 and with its opposite end connected to a windlass 43 driven in a conventional manner from the truck or tractor. When the windlass 43 is rotated to wind the cable 41 around the same, the sheave wheels 38 with the shaft 37 are drawn toward the sheave wheels 39 between the fixed supports 40 to elevate the shaft 31 by the swinging of the arms 33.

Since the shaft 31 is supported in the sleeves 28 on the upper end of the struts 26, the upper ends of the struts are caused to move about the shaft 29 on which the lower ends of the struts are pivoted so that the desired operation is accomplished. When the struts 26 and the body 21 are in lowered substantially horizontal position, the lever arms 33 will be in substantially horizontal position and the arms 36 will be in substantially vertical depending position. When the windlass 43 is rotated to wind in the cable 41, the arms 33 will be moved about the axis of the shaft 31 to depending position as shown in Fig. 3 and the lever arms 36 will be in substantially horizontal position and the body will have been raised with less force than would have been required if the initial elevating mechanism were not employed.

It will be obvious to those skilled in the art that various changes may be made in the invention without departing from the spirit and the scope thereof and therefore the invention is not limited by that which is shown in the drawing and described in the specification but only as indicated in the appended claims.

I claim:

1. In a device of the character described spaced parallel frame members, a body pivoted at its rear end to the rear end of such frame members, strut means for raising the forward portion of said body, said strut means having the lower end thereof pivoted to said frame members forwardly of the pivotal connection between the body and the frame members, a shaft pivoted transversely on the upper end of said strut means, a bell crank having lever arms pivotally carried by said shaft so that movement of one lever arm will move the other, one lever arm being mounted in a position to engage said frame members and the other being provided with a series of sheave wheels, a series of sheave wheels pivoted in fixed position on said frame members, a trackway on the body, the upper end of the strut means being movable along said trackway, a cable extending around each series of sheave wheels and operable for moving them for initially swinging said lever arms so that the first lever arm is swingable downwardly toward the frame members and the second lever arm is swingable toward the fixed sheaves, whereby to impart initial raising motion to said body and with said cable thereafter continuing the movement of said strut means and the raising of said body.

2. In a device of the character described spaced frame members, a body pivoted to said frame members, strut means for raising one end of said body, said strut means having the lower end thereof pivoted to said frame members forwardly of the pivotal connection between the body and the frame members for raising and lowering the body, a shaft pivoted transversely on the upper end of said strut means, a bell crank having lever arms divergently pivoted on said shaft so that movement of one lever arm will swing the other, one lever arm being mounted in a position to engage and exert pressure against said frame members and the other being provided with a series of sheave wheels, a series of sheave wheels pivoted in fixed position on the rear portion of said frame members, a trackway on the body, the upper end of the strut means being movable along said trackway, a cable extending around each series of sheave wheels and operable for moving them for initially swinging said lever arms so that the first lever arm is swingable downwardly toward the frame members and the second lever arm is swingable toward the fixed sheaves, whereby to impart initial raising motion to said body and with said cable thereafter continuing the movement of said strut means and the raising of said body.

3. A vehicle having a frame, a body pivoted on said frame, strut means having the lower end thereof pivoted to said frame and swingable for raising one end of said body to discharge the contents thereof, a series of sheave wheels pivoted in fixed position on said frame, a bell crank having lever arms pivoted on the upper end of said strut means so that when one lever arm is swung it will cause swinging of the other lever arm, a plurality of sheave wheels on one of said lever arms, the other lever arm being mounted in a position to engage and exert pressure against said frame, a trackway on the body, the upper end of the strut means being movable along said trackway, a cable around both sets of sheave wheels for producing relative movement between the same and for initially swinging said lever arms so that the first lever arm is swingable downwardly toward the frame and the second lever arm is swingable toward the fixed sheaves, whereby to impel an initial raising of the body and thereafter continuing the movement of said strut means and the raising of said body.

4. A vehicle comprising a cable operated dump body, a frame pivotally supporting said body adjacent one end thereof, strut means having a pivotal connection at one end thereof with the frame and in spaced relation to the pivot of the body on the frame, a trackway on the body, the other end of the strut means being movable along said trackway, sheave wheels pivotally fixed on said frame, a bell crank lever pivotally connected to said other end of the strut means and having one arm provided with sheave wheels with the other arm initially engaging the frame, a cable extending around said series of sheave wheels and operable for moving them for initally swinging said bell crank lever from one position to a position at a substantial angle thereto and to lift said body during such movement, and a further movement of said cable will move the other end of said strut means along the trackway to additionally raise the body.

5. A vehicle as set forth in claim 4, wherein said bell crank lever comprises a pair of divergent arms, a shaft attached to said arms and carrying a roller, said roller being movable in the trackways, a transverse bar carried by the other arm opposite the movable sheave wheels, and a roller on said transverse bar for engaging a flange on the frame during the initial lifting of the body.

6. A vehicle as set forth in claim 3, wherein the pivotal strut means comprise a pair of spaced struts, a shaft extending between the struts and pivotally connected to the frame, a shaft connecting the free ends of the struts and carrying the bell crank lever arms, rollers on the ends of said last mentioned shaft, a bar on one end of one lever arm for supporting the movable sheave wheels, and a transverse bar on the end of the other lever arm and carrying rollers for engaging flanges on the frame during the initial lifting of the body.

References Cited in the file of this patent

UNITED STATES PATENTS

| | | |
|---|---|---|
| 2,593,776 | Margala | Apr. 22, 1952 |

FOREIGN PATENTS

| | | |
|---|---|---|
| 539,757 | France | June 30, 1922 |